(12) United States Patent
Colineau et al.

(10) Patent No.: US 11,718,373 B2
(45) Date of Patent: Aug. 8, 2023

(54) BALLAST SEAL

(71) Applicant: Carl Freudenberg KG, Weinheim (DE)

(72) Inventors: Francois Colineau, Schallstadt-Leutersberg (DE); Jens Hofmann, Mannheim (DE); Thomas Klenk, Dossenheim (DE)

(73) Assignee: CARL FREUDENBERG KG, Weinheim (DE)

( * ) Notice: Subject to any disclaimer, the term of this patent is extended or adjusted under 35 U.S.C. 154(b) by 370 days.

(21) Appl. No.: 16/274,280

(22) Filed: Feb. 13, 2019

(65) Prior Publication Data

US 2019/0276119 A1 Sep. 12, 2019

(30) Foreign Application Priority Data

Mar. 8, 2018 (DE) ...................... 10 2018 105 376.2

(51) Int. Cl.
*B63B 13/00* (2006.01)
*B63B 3/13* (2006.01)
*B63B 11/04* (2006.01)
*F16J 15/06* (2006.01)
*B63B 43/04* (2006.01)

(52) U.S. Cl.
CPC ............... *B63B 13/00* (2013.01); *B63B 3/13* (2013.01); *B63B 11/04* (2013.01); *F16J 15/064* (2013.01); *B63B 2043/042* (2013.01); *B63B 2207/00* (2013.01)

(58) Field of Classification Search
CPC .... F16J 15/064; B63B 13/00; B63B 2207/00; B63B 2043/042; B63B 11/04; B63B 3/13
See application file for complete search history.

(56) References Cited

U.S. PATENT DOCUMENTS

| 6,666,459 | B1 * | 12/2003 | Hufnagel | F16J 15/3232 |
| | | | | 277/572 |
| 6,736,403 | B2 * | 5/2004 | Kreutzer | F16J 15/3232 |
| | | | | 277/551 |
| 10,161,522 | B2 | 12/2018 | Colineau et al. | |
| 10,190,690 | B2 | 1/2019 | Colineau et al. | |
| 10,520,092 | B2 * | 12/2019 | Dilmaghanian | F16J 15/3236 |
| 2004/0232620 | A1 * | 11/2004 | Bock | G01M 3/045 |
| | | | | 277/320 |

(Continued)

FOREIGN PATENT DOCUMENTS

| DE | 2621352 A1 | 12/1977 | |
| DE | 10117881 A1 * | 11/2002 | ........... F16J 15/3288 |

(Continued)

OTHER PUBLICATIONS

Machine Translation of DE 26 21 352 A1.*

*Primary Examiner* — Eugene G Byrd
(74) *Attorney, Agent, or Firm* — Leydig, Voit & Mayer Ltd.

(57) ABSTRACT

A ballast seal for a sealing ring includes: a substantially annular potential equalization ring made of an electrically-conductive material and which can be brought into contact in a sealing manner with a surface to be sealed of a machine element to be sealed; and at least one shielding ring made of a soft magnetic material so as to shield against electromagnetic interfering waves.

9 Claims, 3 Drawing Sheets

(56) References Cited

U.S. PATENT DOCUMENTS

| | | | |
|---|---|---|---|
| 2008/0207032 A1* | 8/2008 | Horsch | F15B 13/0846 439/271 |
| 2010/0276894 A1 | 11/2010 | Jin et al. | |
| 2016/0084100 A1* | 3/2016 | Davis | F01D 11/006 60/805 |
| 2017/0172018 A1* | 6/2017 | Dilmaghanian | F16J 15/3236 |
| 2019/0226582 A1* | 7/2019 | Hensel | H01R 4/48 |

FOREIGN PATENT DOCUMENTS

| | | | | |
|---|---|---|---|---|
| DE | 102010018270 A1 | 12/2010 | | |
| DE | 10042834 B4 * | 3/2014 | | F16J 15/3456 |
| DE | 102012017805 A1 | 3/2014 | | |
| DE | 102013000982 A1 | 7/2014 | | |
| DE | 102014010269 A1 | 1/2016 | | |
| EP | 3633243 A1 * | 4/2020 | | F16J 15/3228 |
| JP | 2014207822 A | 10/2014 | | |

* cited by examiner

BALLAST SEAL

CROSS-REFERENCE TO PRIOR APPLICATION

Priority is claimed to German Patent Application No. DE 10 2018 105 376.2, filed on Mar. 8, 2018, the entire disclosure of which is hereby incorporated by reference herein.

FIELD

The invention relates to a ballast seal for a sealing ring, comprising a substantially annular potential equalization ring which is made of an electrically-conductive material and which can be brought into contact in a sealing manner with a surface to be sealed of a machine element to be sealed.

BACKGROUND

From DE 10 2013 000 982 A1 is known a seal comprising a sealing ring having at least one dynamically-stressed sealing lip, and such a ballast seal. The ballast seal is arranged at an axial distance to be adjacent to the sealing lip and consists of an electrically-conductive material. The sealing lip and the ballast seal enclose in a sealing manner a surface to be sealed of a first machine element to be sealed, wherein the first machine element is arranged at a radial distance to be adjacent to a second machine element. The sealing ring and the ballast seal are arranged in the gap formed by the radial distance. The second machine element is grounded to a defined ground potential, wherein the first and second machine elements are respectively contacted adjacently by the ballast seal and are thereby electrically-conductively connected to one another.

The ballast seal is formed as a potential equalization ring and consists, for example, of an electrically-conductive, non-woven fabric impregnated with PTFE. Mechanical damage to the machine elements due to an electrical voltage breakdown is, consequently, ruled out.

Without the electrical potential equalization, mechanical damage to the machine elements to be sealed against one another could occur as a result of electrical potentials, differing in size, of the machine elements being equalized by an electrical voltage breakdown. Such a voltage breakdown is more likely the more closely adjacent the machine elements with different electrical potentials are assigned to one another. A voltage breakdown can cause a material removal at the machine element with a relatively lower charge and a change in the material structure in the region in which the voltage breakdown takes place. An effective shielding against electromagnetic interfering waves—in particular, an effective shielding against electromagnetic interfering waves with a frequency ≥30 MHz—is not possible by means of the potential equalization element.

DE 10 2014 010 269 A1 discloses a further ballast seal. The ballast seal comprises a substantially annular disk made of an electrically-conductive and air-permeable material and a supporting body, wherein the disk is designed as a separately-produced individual part with respect to the supporting body and is connected to the supporting body.

The supporting body can be formed by a sealing ring.

The ballast seal has not only the task of potential equalization, but also the task of preventing contaminants from the environment from penetrating to the sealing lip of the sealing ring.

The ballast seal is a decoupled electrical bridge. The term, "decoupled," is understood in this context to mean that the sealing function of, for example, a sealing ring combined with the ballast seal is decoupled from the function of the electrical bridge, viz., in order to avoid a voltage breakdown and to bring about an electric potential equalization between machine elements.

The ballast seal is not in direct contact with the medium to be sealed. In this case, it is advantageous that the electrical resistance of the ballast seal is substantially constant during the entire service life of the ballast seal. If the ballast seal were to come into contact with the medium to be sealed, the resistance would change unpredictably.

DE 10 2010 018 270 A1 discloses an electrically-conductive sealing arrangement which is used in hybrid and electric vehicles. The electrically-conductive sealing arrangement shall prevent distributed RF energy from leading to undesired interferences, e.g., to interferences of a radio in a motor vehicle. These unwanted interferences are to be prevented by the sealing ring consisting of an electrically-conductive material and being electrically-conductively arranged between a shaft to be sealed and a housing.

Generally, the aforementioned electrically-conductive materials are not well suited for satisfactorily shielding against electromagnetic interfering waves—particularly when the ballast seal is used in connection with e-mobility, and the electromagnetic interfering waves therefore have a frequency which is often ≥30 MHz.

SUMMARY

In an embodiment, the present invention provides a ballast seal for a sealing ring, comprising: a substantially annular potential equalization ring comprising an electrically-conductive material and which can be brought into contact in a sealing manner with a surface to be sealed of a machine element to be sealed; and at least one shielding ring comprising a soft magnetic material so as to be configured to shield against electromagnetic interfering waves.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
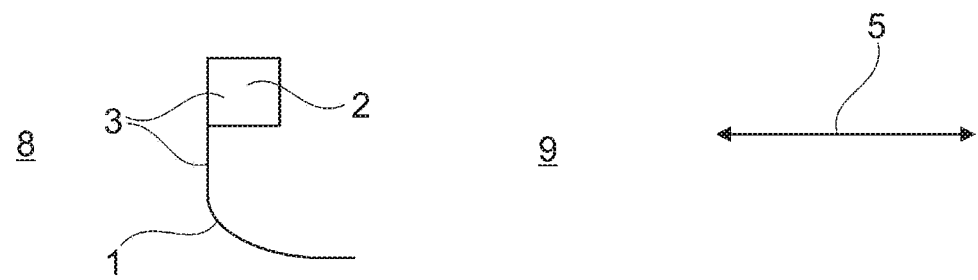
FIG. 1 a first exemplary embodiment of a ballast seal, comprising the potential equalization ring and the shielding ring, FIG. 2 a second exemplary embodiment similar to the exemplary embodiment of FIG. 1, wherein a further shielding ring is additionally used, FIG. 3 an exemplary embodiment of a sealing arrangement, in which the ballast seal according to FIG. 1 and, additionally, a sealing ring are used.

In an embodiment, an aim of the invention is to further develop a ballast seal of the type mentioned at the outset in such a way that it has further functions in addition to the sealing function and can therefore be used to particular advantage in the technical field of e-mobility. In particular, by means of the ballast seal, electromagnetic interfering waves with a frequency ≥30 MHz are able to be effectively shielded against.

The aim is achieved by a ballast seal for a sealing ring, comprising a substantially annular potential equalization ring which is made of an electrically-conductive material and which can be brought into contact in a sealing manner with a surface to be sealed of a machine element to be sealed, and at least one shielding ring made of a soft magnetic material for shielding against electromagnetic interfering waves.

In comparison to electrically-conductive, non-woven fabrics or electrically-conductive polymers, soft magnetic materials bring about a stronger shielding as a result of higher volume proportions of shielding-relevant material components. As stated above, it has been found that potential equalization rings, which must necessarily consist of an electrically-conductive material in order to fulfill their function, are not well suited for effectively shielding against electromagnetic interfering waves. In particular, only then, when the electromagnetic interfering waves have a frequency ≥30 MHz, is the shielding insufficient.

A shielding ring made of a soft magnetic material is on, the other hand, very well suited for shielding against electromagnetic interfering waves. Such shielding rings can effectively shield against even electromagnetic interfering waves such as occur in the field of e-mobility, viz., electromagnetic interfering waves with a frequency ≥30 MHz.

As a result of the soft magnetic materials used, which are ferromagnetic materials, the shielding ring is not electrically conductive, in contrast to the potential equalization rings described above. As a result, such a shielding ring is unsuitable as a potential equalization ring; the shielding ring has no task other than shielding against electromagnetic interfering waves.

As a result of the potential equalization ring, the ballast seal causes a controlled electrical potential equalization between machine elements and, at the same time, as a result of the shielding ring, the shielding against electromagnetic interfering waves such as occur, in particular, in the field of e-mobility.

Mechanical damage to the machine elements to be sealed against one another as a result of an electrostatic charge of one of the machine elements, and a subsequent voltage breakdown to the other machine element having a different electrical potential, are ruled out by means of the potential equalization ring. During the intended use of the ballast seal, one of the machine elements to be sealed against one another is grounded to a defined ground potential (for example, the body of a motor vehicle as an electrical ground potential), so that a potential equalization with respect to the other machine element is achieved by the electrically-conductive ballast seal.

The ballast seal is a decoupled electrical bridge. The term, "decoupled," is understood in this context to mean that the sealing function of, for example, a sealing ring combined with the ballast seal is decoupled from the function of the electrical bridge, viz., in order to avoid a voltage breakdown and to cause an electric potential equalization between machine elements.

The ballast seal is not in direct contact with the medium to be sealed. In this case, it is advantageous that the electrical resistance of the ballast seal is substantially constant during the entire service life of the ballast seal. If the ballast seal were to come into contact with the medium to be sealed, the resistance would change unpredictably.

Good effectiveness of shielding ring and potential equalization can only be ensured if a strict functional separation is carried out. Because the shielding ring is electrically non-conductive/insulating, it is not suitable for potential equalization.

Conversely, a sealing ring made of an electrically-conductive sealing material cannot ensure an effective shielding against electromagnetic interfering waves—especially not when the electromagnetic interfering waves are at a high frequency, in a frequency range ≥30 MHz. A separately-produced potential equalization ring consisting of an electrically-conductive material is also not able to do so.

The potential equalization ring and the shielding ring are connected to one another and preferably form a pre-assemblable first unit. In this case, it is advantageous that the ready-to-use ballast seal consists only of the pre-assemblable first unit and can be installed as a whole in a sealing arrangement. As a result, assembly is particularly easy, and the risk of assembly errors is limited to a minimum.

According to an advantageous embodiment, it can be provided that the shielding ring be formed by a ferrite ring. Such a ferrite ring is virtually electrically non-conductive/electrically insulating. The ferrite ring can consist of sintered ceramic. The materials of which soft magnetic ferrite rings consist are generally known and are not the subject matter of the present invention.

Since soft magnetic ferrites, as described above, are electrically non-conductive/insulating, eddy current losses do not occur, and they are even well suited for shielding against electromagnetic interfering waves with high frequencies in the range ≥30 MHz.

Depending upon the respective conditions of the application—in particular, depending upon the frequency of the electromagnetic interfering waves to be shielded against, it may be provided that at least two shielding rings be arranged in a functional series connection.

Such a functional series connection can be achieved by the at least two shielding rings being arranged to be adjacent to one another in the axial direction and forming a pre-assemblable unit. The higher the number of shielding rings used is, the better the high-frequency, electromagnetic interfering waves are dampened.

The at least two shielding rings may form a pre-assemblable second unit. The assembly of the ballast seal is particularly easy as a result. Due to the modular structure of the shielding rings, the unit can be adapted well to the respective conditions of the application—in particular, to the magnitude of the frequency of the electromagnetic interfering waves to be shielded against.

The potential equalization ring can be formed by an air-permeable and electrically-conductive, non-woven ring. Such a non-woven ring is, as mentioned at the outset, known, for example, from DE 10 2013 000 982 A1. Alternatively, the potential equalization ring can consist of an electrically-conductive polymer material.

Depending upon the application, at least two potential equalization rings may, for example, be provided.

The invention also relates to a sealing arrangement, comprising a ballast seal as described above and a sealing ring, wherein the ballast seal is arranged on the side facing axially away from a space to be sealed, i.e., on the side of the sealing ring facing the environment. The ballast seal may be used together with various sealing rings, wherein the sealing rings, by combination with the ballast seal, are very well suited for use in the field of e-mobility. By combining the sealing ring with the ballast seal, the entire sealing arrangement is at the same time suitable for sealing media to be sealed, for good potential equalization, and for effective shielding against electromagnetic interfering waves.

Both the ballast seal itself and the sealing arrangement are each multifunctional.

The machine elements to be sealed against one another can be formed by a drive shaft of an electric motor and by a housing of a transmission connected to the electric motor and surrounding the drive shaft. During the intended use of an electric motor, its drive shaft may be electrostatically charged, and electromagnetic interfering waves may arise. This specific use of the ballast seal arrangement is particularly advantageous. If the electric motor and the transmission together form the drive unit, the operation of the electric motor usually results in a static charging of individual components of the drive unit, and thus in potential differences between the components to be sealed against one another. These potential differences must be compensated for, in order to avoid undesired voltage breakdowns. Moreover, during the intended use, electromagnetic interfering waves in the range ≥30 MHz arise, which the shielding ring effectively shields against in order to prevent interferences in the environment of the ballast seal.

The ballast seal and the sealing ring may form a pre-assemblable third unit. This third unit, comprising the ballast seal with the potential equalization ring and the shielding ring as well as the sealing ring, can then be installed as a whole. The risk of assembly errors is thereby reduced to a minimum.

Figure 2:
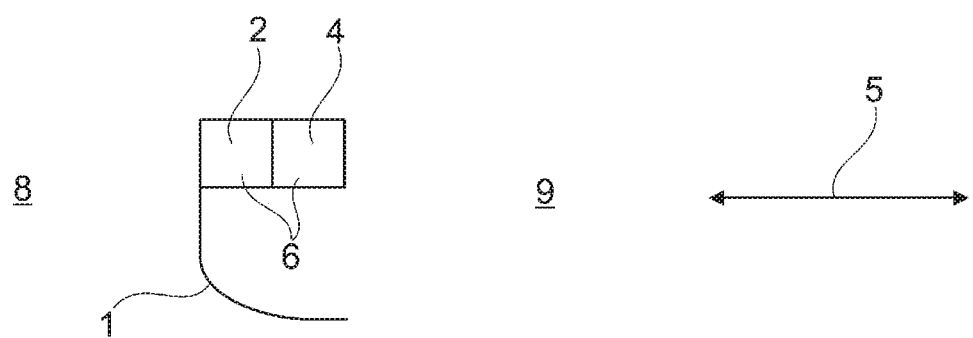
Figure 3:
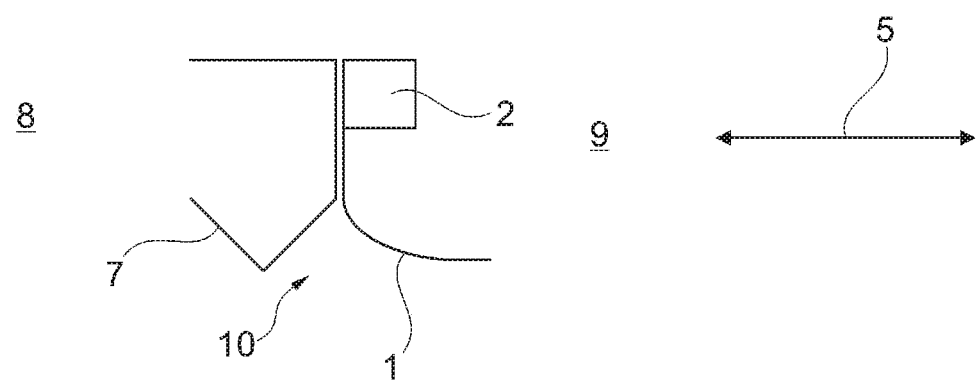

FIGS. 1 through 3 each show a ballast seal, which comprises the essentially annular potential equalization ring 1 and the shielding ring 2.

The potential equalization ring 1 consists of an electrically-conductive material—in the illustrated exemplary embodiment, of an air-permeable and electrically-conductive, non-woven ring.

In contrast, the shielding ring 2 consists of a soft magnetic material, which is electrically non-conductive/electrically insulating.

The potential equalization ring 1 and the shielding ring 2 together form the pre-assemblable first unit 3.

FIG. 1 shows an exemplary embodiment of a ballast seal in its simplest form.

FIG. 2 shows a second exemplary embodiment which differs from the exemplary embodiment of FIG. 1 in that a total of two shielding rings 2, 4, which together form the pre-assemblable second unit 6, are used. The two shielding rings 2, 4 are arranged in a functional series connection in order to improve the effect of the shielding against electromagnetic interfering waves.

FIG. 3 shows a sealing arrangement, comprising the ballast seal according to FIG. 1. The ballast seal of FIG. 1 is combined with the sealing ring 7, wherein the ballast seal is arranged on the side facing axially away (i.e., in a direction of axial direction 5) from a space 8 to be sealed, i.e., on the side of the sealing ring 7 facing the environment 9. Together with the sealing ring 7, the ballast seal as shown in FIG. 1, i.e., the first unit 3, forms the pre-assemblable third unit 10.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ballast seal for a sealing ring, comprising:
   a substantially annular potential equalization ring comprising an electrically-conductive material and which can be brought into contact in a sealing manner with a surface to be sealed of a machine element to be sealed; and
   at least one shielding ring comprising a soft magnetic material so as to be configured to shield against electromagnetic interfering waves, the at least one shielding ring being electrically non-conductive.

2. The ballast seal according to claim 1, wherein the potential equalization ring and the shielding ring are connected to one another and form a pre-assemblable first unit.

3. The ballast seal according to claim 1, wherein the shielding ring comprises a ferrite ring.

4. The ballast seal according to claim 1, wherein the at least one shielding ring comprises at least two shielding rings, the at least two shielding rings being arranged in a functional series connection.

5. The ballast seal according to claim 4, wherein the at least two shielding rings are arranged to be adjacent to one another in an axial direction.

6. The ballast seal according to claim 4, wherein the at least two shielding rings form a pre-assemblable second unit.

7. The ballast seal according to claim 1, wherein the potential equalization ring comprises an air-permeable and electrically-conductive non-woven ring.

8. A sealing arrangement, comprising:
   the ballast seal according to claim 1; and
   a sealing ring,
   wherein the ballast seal is arranged on a side axially facing away from a space to be sealed, on a side of the sealing ring facing the environment.

9. The sealing arrangement according to claim 8, wherein the ballast seal and the sealing ring form a pre-assemblable third unit.

* * * * *